3,606,811
ROTARY SHEAR
Karl W. Hallden, deceased, late of Thomaston, Conn., by The Colonial Bank and Trust Co., executor, Waterbury, Conn., assignor to The Hallden Machine Company, Thomaston, Conn.
Original application Nov. 25, 1968, Ser. No. 778,593. Divided and this application June 30, 1970, Ser. No. 51,274
Int. Cl. B23d *25/12;* B26d *1/40, 7/26*
U.S. Cl. 83—305                                                                 7 Claims

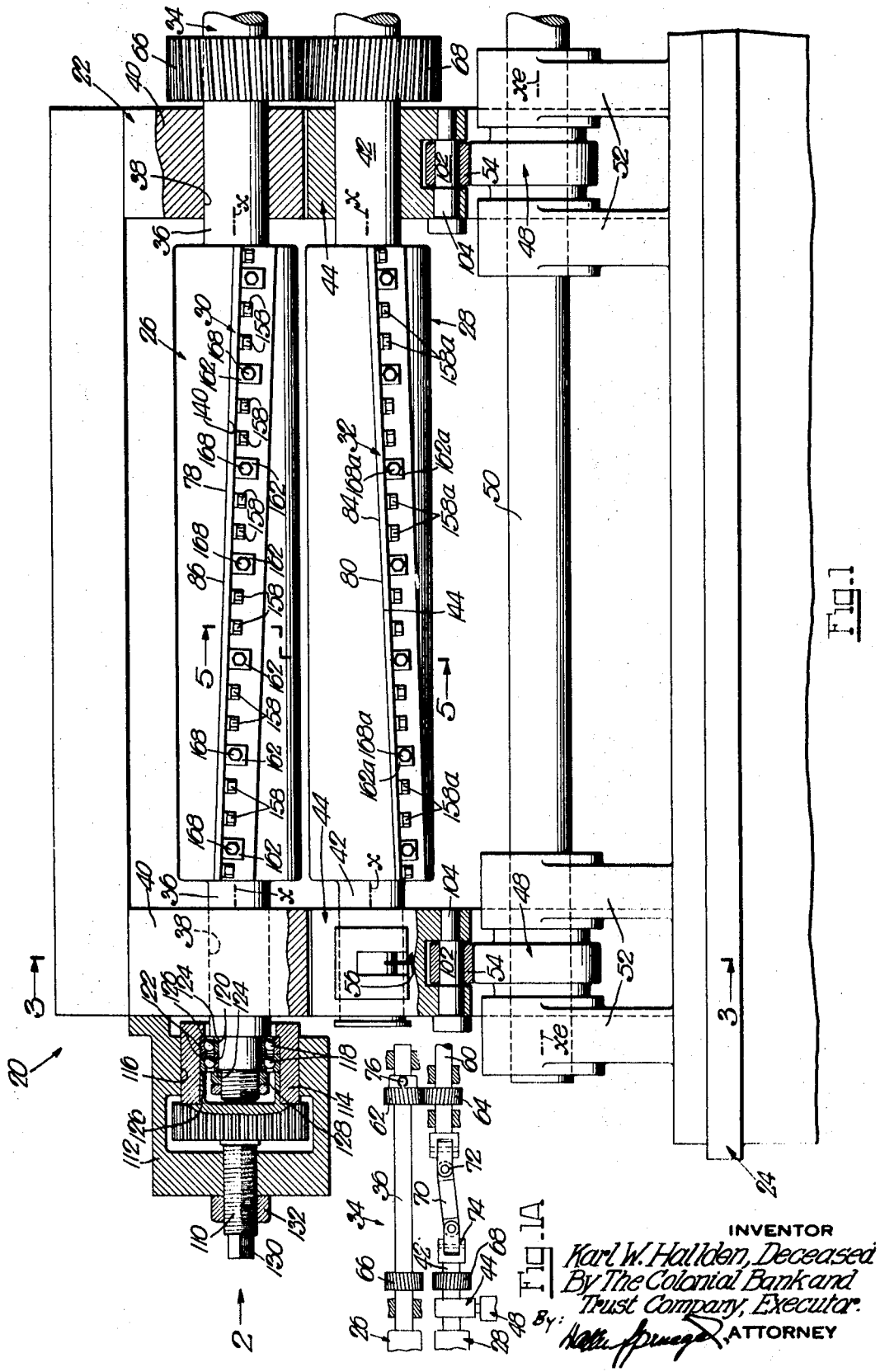

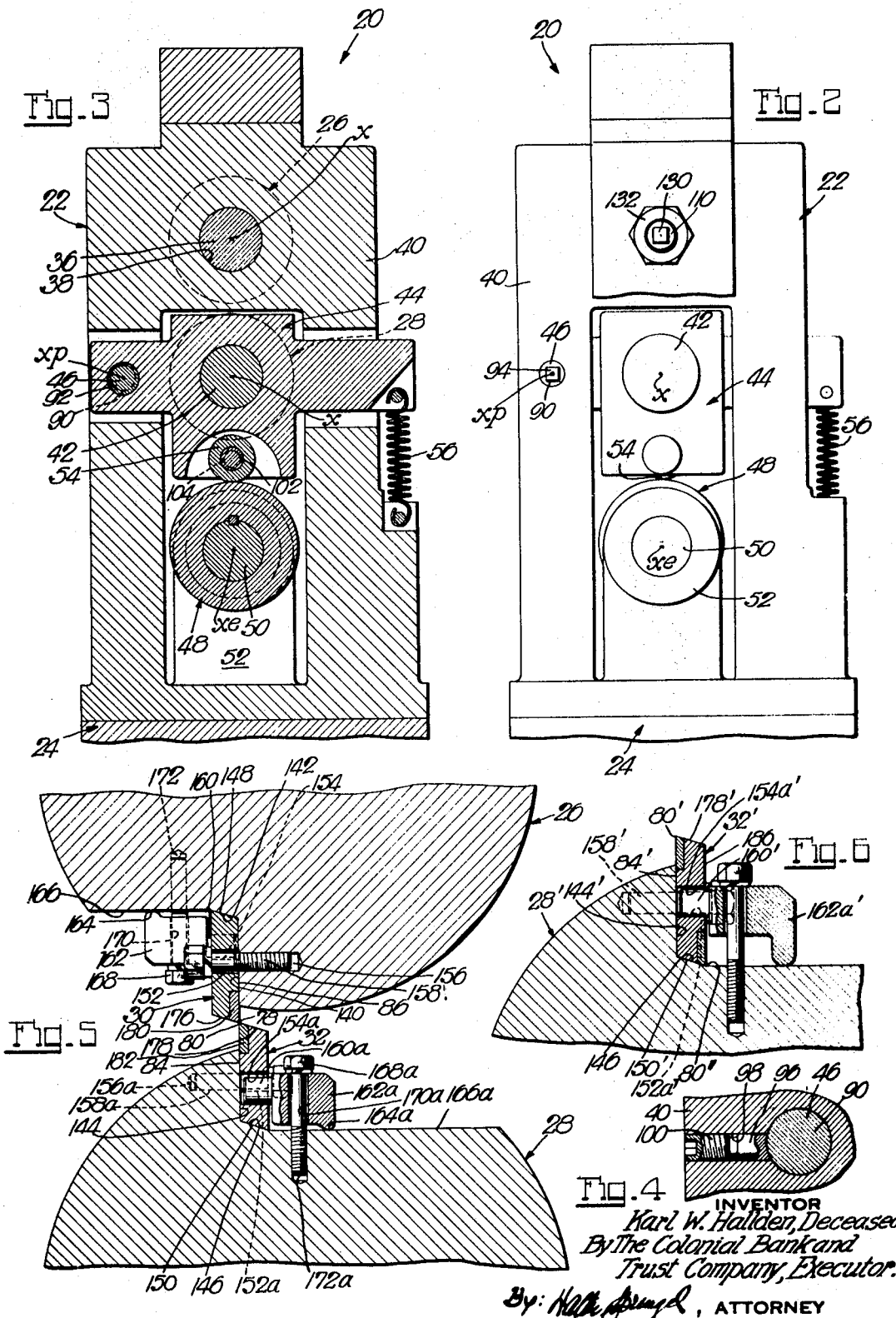

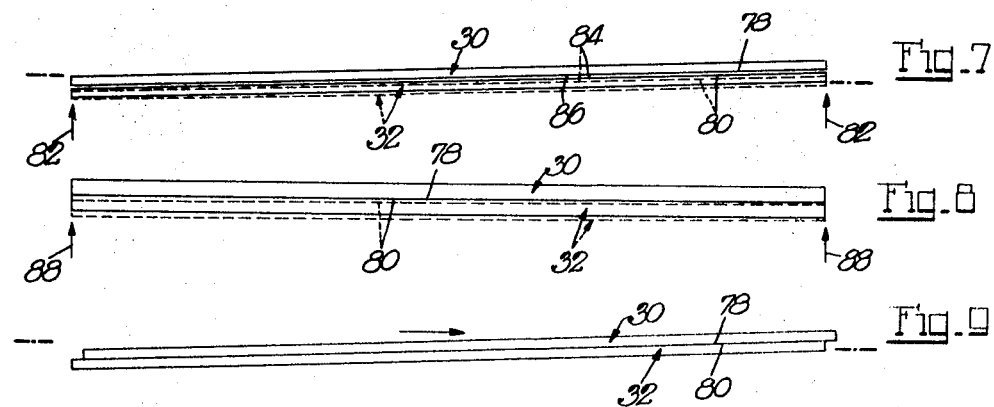

ABSTRACT OF THE DISCLOSURE

For cutting coordination of shear blades which are non-adjustably locked directly to the companion shear drums of a rotary shear, the opposite end bearings of one of the shear drums are mounted in the shear frame for individual adjustability in two transverse directions one of which is to and from the axis of the other shear drum.

---

This is a division of application Ser. No. 778,593, filed Nov. 25, 1968.

This invention relates to rotary shears, and more especially, though not exclusively, to rotary shears with helical shear blades.

It is conventional practice in known rotary shears to mount the companion shear blades on the shear drums for removal therefrom to resharpen or replace them, and additionally to mount at least one of the blades on its drum for adjustability thereon to bring it into, and maintain it in, effective cutting coordination with the blade on the other drum. While the removable mounting of the blades on their drums presents no problem, the imperative adjustable mounting of at least one of the blades on its drum entails some serious drawbacks. Thus, in rotary shears with helical blades for cutting paper or similar soft stock, the the blades, which are really straight blades, are resiliently flexed against helical backing surfaces and bolted thereto in such flexed condition, with one of these backing surfaces being provided directly on one of the companion drums, and the other backing surface being provided on a bracket which is adjustable on the other drum for bringing its blade into cutting coordination with the other blade. Adjustment of the bracket to this end requires very considerable skill and is a most tedious task, involving bringing its blade into cutting coordination with the other, fixed blade progressively over their helical extent by adjusting the bracket progressively on its drum by manipulation of a large number of adjustment bolts. At that, it is virtually impossible to adjust the bracket on its drum for such accurate cutting coordination of the companion blades that they will sever paper or like stock without fail, wherefore it is customary to use in conjunction with a usual hard steel blade a softer blade the cutting edge of which will, by contact with that of the hard blade in running of the shear, be formed into effective cutting coordination with the hard blade. Further, on resharpening or replacing either or both of the companion blades, renewed tedious adjustment of the blade-carrying bracket on its drum for best possible cutting coordination of the blades is imperative. Despite these and also other drawbacks of these "paper" shears, attempts have been made to use them for cutting metal, including steel, stock as is done by rotary shears with straight companion blades, owing to a number of advantages of helical blades over straight blades in rotary shears, such as greater blade penetration into the stock with less noise in cutting the same, less power for running the shear and less operating strain in the components of the shear in its cut performance and also permissible smaller size and less bulk of the shear, all by virtue of the progressive shear action of helical blades on stock. However, this proved to be totally impractical, because the cutting edge of a soft blade, if at all cutting such metal stock, will do so for a very short time at the most before becoming completely dull, and if only very hard blades are used as is required for cutting such stock, their cutting edges will dull almost as fast as that of a soft blade, owing to lack of accuracy of the cutting coordination of the blades on even best possible adjustment of the blade-carrying bracket on its drum, and also inherent inadequate strength of the bolt-type bracket adjustment to withstand without any give whatsoever the progressive, and hence prolonged, stresses to which the blades are subjected in each helical cut action on such stock. Accordingly, rotary shears for cutting metal stock have very hard companion blades with straight cutting edges parallel to the axes of their drums, but these shears have all the drawbacks of shears with helical companion blades, except that their blades will perform for a longer period than similarly hard helical blades in cutting such metal stock before they require resharpening. At that, these straight blades require all too frequent resharpening, usually after each eight hour performance of the shear, and it is only for lack of a better blade coordination arrangement that such frequent resharpening of the blades is accepted as a necessary evil.

It is one of the important objects of the present invention to provide a rotary shear with helical shear blades which not only must cut metal stock entirely satisfactorily, but their cutting edges must remain sharp much longer, and hence require resharpening far less frequently, than straight blades performing on the same metal stock, yet the cost of the shear is no more than that of a metal-cutting shear with straight companion blades. Such a shear is far superior to a metal-cutting shear with straight blades, not only because the blades last far longer before requiring resharpening, but for the first time all of the aforementioned highly important advantages of progressive shear action of helical blades are realized in a metal cutting shear.

It is another object of the present invention to provide a rotary shear of which the helical shear blades on the companion drums are adjustable into cutting coordination of greater accuracy and with far greater facility, and are also locked in their adjustment with far greater firmness, than heretofore. This superior blade adjustment is equally important in cutting metal or paper, and in the case of paper shears obviates the need for a soft blade and permits the use of long-lasting hard blades with entirely satisfactory shear action.

It is a further object of the present invention to provide a rotary shear in which the aforementioned great facility and accuracy of the adjustment of the helical shear blades into, and the great firmness of their lock in, cutting coordination are achieved by providing, not for adjustment of one of the companion blades on its drum as heretofore, but rather for adjustment of the entire drum on one, and preferably both, of its end supports, and by bolting the blade to this drum directly and non-adjustably with a force of any magnitude at which this blade will to all intents and purposes be an integral part of its drum. With this arrangement, coordination of this blade with the drum, in point of the helical disposition thereon of its cutting edge, is far simpler, and also achieved far more quickly, than heretofore with adjustment bolts, with this blade and drum coordination being of the high accuracy easily achieved in machining on the drum a shoulder which is shaped to conform accurately to the intended helical blade disposition on the drum and against which the blade is firmly clamped. Further, with this helical blade coordination with the drum being already accurately established on mere clamping of the blade to the machined shoulder on the drum, final adjustment of the companion blades on both drums into cutting coordination is particularly simple in that the blades will be brought into cutting coordination with optimum accuracy throughout on drum adjustment to bring merely the opposite ends of the companion blades into accurate cutting coordination. Moreover, the companion blades are locked with particular firmness in such final cutting coordination, because the firmness of their locked coordination is equal to the firmness of the drum adjustment against disturbance from the operational stresses in the shear components, and the firmness of the drum adjustment is necessarily great to cope with these operational stresses and also with the quite considerable mass and weight of the adjusted drum.

Another object of the present invention is to provide a rotary shear in which the aforementioned adjustability of the shear drum is independent adjustability of the same on each of its opposite end supports in two transverse, and particularly rectangular, directions of which one is to and from the axis of the companion drum. With this arrangement, the companion blades are brought into accurate cutting coordination throughout by the exceedingly simple expediency of first adjusting the drum on one of its end supports for the sole purpose of bringing only the nearby ends of the blades into accurate cutting coordination, and then repeating the drum adjustment on its other end support for the same sole purpose of bringing only the nearby other ends of the blades into accurate cutting coordination. Further, the two given transverse directions in which the drum is adjustable are further conducive to achieving simplest and quickest cutting coordination of the companion blades, in that adjustment of the drum in one of these directions to final cutting coordination of the blades in that one direction is not only feasible but remains undisturbed by subsequent adjustment of the drum in the other of these directions to final cutting coordination of the blades in this other direction.

A further object of the present invention is to provide a rotary shear in which the aforementioned independent adjustability in the given directions of the shear drum on its end supports is provided by arranging for such independent adjustability of the opposite end bearings of this drum in the shear frame. With this arrangement, the journal support of this drum afforded by its end bearings in accurate and lasting fashion will remain undisturbed by the drum adjustment.

It is another object of the present invention to provide a rotary shear in which all of the aforementioned objects are realized, and which is also adapted for miscutting by being of the type in which the end bearings of one shear drum are independently pivotally mounted in the shear frame for swinging motion of this "miscut" drum into and from cutting relation with its companion drum, and each of these pivoted end bearings is in follower relation with a miscut cam or eccentric.

It is a further object of the present invention to provide a rotary shear of this miscut type in which, for accurate cutting coordination of the companion shear blades, the aforementioned advantageous separate adjustability in two transverse directions of the end bearings of one of the shear drums is provided in the pivot supports of the end bearings of the miscut drum in the shear frame for bearing adjustability in one of these transverse directions, and in the follower arrangement of these same end bearings with the miscut cams for bearing adjustability in the other of these transverse directions. With this arrangement, the adjustability of these end bearings is provided in the simplest manner at their sole supports, i.e., their pivot supports in the shear frame and their follower support on the miscut cams.

It is another object of the present invention to provide a rotary shear of this miscut type in which the aforementioned adjustability of the end bearings of the miscut drum at their sole supports is achieved, by arranging for rotative adjustability of their pivots in the shear frame and providing these pivots with eccentric formations on which the end bearings are swingable, and further providing these end bearings with rotatively adjustable cams, and preferably eccentric studs with turnable rolls with which the bearings rest on, and are in follower relation with, the miscut cams. With this arrangement, adjustment of the miscut drums in two transverse directions is of the characteristic simplicity and also great accuracy afforded by adjustable eccentrics. Further, with adjustment, even at needed maximum, of the miscut drum in two transverse directions for accurate cutting coordination of the companion shear blades involving in any shear of fair precision construction at the most very slight bodily motion of this drum in either direction, the adjustment eccentrics, while of sufficient mass for minimum wear for the longest time under the operational stresses in the shear, may advantageously have relatively small effective radii which not only readily afford any needed adjustment of the miscut drum, but even more important, afford to the considerable forces in shear operation to which the eccentrics are subjected in any adjusted position, at the most very small lever arms about the rotary axes of these eccentrics, wherefore these eccentrics may be adjusted to infinite positions and will readily be secured in any adjusted position with reasonable force adequate to lock them against displacement from adjusted position under any and all operational forces. Moreover, the preferred small effective radii of the adjustment eccentrics that cooperate with the miscut cams secure the further advantage that the peripheral contact area between the eccentrics and the miscut cams at the times of cut shift so very little over the entire adjustment range of these eccentrics that the timing of the cut cooperation of the companion blades remains to all practical intents and purposes the same in any adjusted position of these eccentrics.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a front view, partly in section, of a rotary shear embodying the present invention;

FIG. 1A is a diagrammatic view of a drive component of the shear;

FIG. 2 is an end view of the shear as seen in the direction of arrow 2 in FIG. 1;

FIG. 3 is a section through the shear taken substantially on the line 3—3 of FIG. 1;

FIG. 4 is an enlarged fragmentary section through certain detail structure of the shear;

FIG. 5 is an enlarged fragmentary section through the shear taken substantially on the line 5—5 of FIG. 1;

FIG. 6 is a fragmentary section similar to FIG. 5, but showing a modification in the shear construction; and FIGS. 7 to 9 are diagrammatic views of the companion blades of the shear depicting their adjustment into cutting coordination.

Referring to the drawings, and more particularly to FIGS. 1 to 3 thereof, the reference numeral 20 designates a rotary shear having a shear frame 22 on a base or bed 24, upper and lower companion shear drums 26 and 28 with companion shear blades 30 and 32, and a shear drive 34. With the shear being in this example of miscut type, the upper drum 26 is with its shaft 36 supported in bearing apertures 38 in spaced uprights 40 of the frame 22, while the lower drum 28 is mounted for movement to and from cut relation with the upper drum 26. The lower drum 28 is to this end supported with its shaft 42 in end bearings 44 which are in the form of rockers swingably mounted on pivots 46 in the uprights 40 of the frame 22 (FIG. 3). Cooperating with each end bearing 44 is a miscut cam or eccentric 48 on a shaft 50 which is journalled in suitable bearing brackets 52 on the frame 22, with each end bearing 44 carrying a rotatable roller 54, and a return spring 56 holding each end bearing 44 with its roller 54 in follower relation with the respective miscut eccentric 48. The lower or miscut drum 28 is in this instance shown in cut relation with the upper drum 26 in which the pivoted end bearings 44 are with their rollers 54 in follower relation with the high portions of the miscut eccentrics 48. Preferably, the end bearings 44 of the lower drum 28 are identical and their pivot supports 46 have a common axis $xp$ which extends parallel to the drum axes $x$, and the miscut eccentrics 48 have the same effective radii and also extend with their common axis $xe$ parallel to the drum axes $x$.

The shear drive 34 includes the drum shafts 36 and 42, and further provides a power-driven shaft 60 extending in spaced parallel relation with the upper drum shaft 36, and drive connections between the power shaft 60 and the drum shafts 36 and 42 (FIG. 1A), with these drive connections being a pair of meshing gears 62, 64 on the shafts 36 and 60, another pair of gears 66, 68 on the drum shafts 36 and 42, and a stub shaft 70 having universal connections 72 and 74 with the power shaft 60 and the lower drum shaft 42. For a purpose described hereinafter, the gears 66, 68 have helical teeth, and the other gears 62, 64 preferably have also helical teeth. FIG. 1A shows the lower drum in exemplary miscut position in which the gears 66, 68 are out of mesh, but these gears will be in mesh with each other in cut position of the lower drum (FIG. 1). Further, the gears 62, 64, 66 and 68 have the same pitch diameters so that the drums 26 and 28 are driven at a one-to-one ratio regardless of whether the gears 66 and 68 are in or out of mesh with each other. Gears 64, 66 and 68 are in this instance firmly mounted on their respective shafts 60, 36 and 42, while gear 62 is at 76 releasably secured in any angular position to the shaft 36. The gears 62 and 64, and also the gears 66, 68 when in mesh, lock the drums 26, 28 in their relative angular relation and thereby maintain the companion blades 30 and 32 in precise relative angular cut relation.

The shear drive 34 further includes shaft 50 of the miscut eccentrics 48, and a variable drive connection (not shown) between the power shaft 60 and the "miscut" shaft 50 for the drive of the latter to provide cut action of the drums 26, 28 after a variable number of miscut actions of the lower drum 28. The shear described so far is conventional and forms no part of the present invention except insofar as it enters into combination therewith.

While the exemplary shear 20 could have straight shear blades 30 and 32 which extend with their cutting edges parallel to the axes $x$ of their respective drums 26 and 28, it is greatly preferred to provide these shear blades 30 and 32 as helical blades, as shown. Further, and in accordance with a very important aspect of the present invention, the present shear with its helical shear blades 30 and 32 is further constructed to lend itself to cutting equally well stock of most any kind, including paper and particularly metal of any hardness, with numerous advantages to boot. Such further construction of the shear to that end is in accordance with further important aspects of the invention, and involves primarily cutting coordination of the companion shear blades over their lengths and the mount of the latter on their respective drums, besides other considerations.

Insofar as cutting coordination of the helical companion shear blades over their lengths is concerned, such is no longer achieved by adjustment of one of the blades in its mount on the associated drum as done heretofore but then only in "paper shears," but is achieved by sole adjustment of this one drum itself to bring its fixed and non-adjustable helical blade thereon into cutting coordination with the other helical blade. Involved in such adjustment of one of the drums is bodily adjustability of the same in transverse, and particularly in two transverse, directions of which one is to and from the axis of the other drum. In this connection, FIGS. 7 and 8 illustrate diagrammatically the adjustment of one of the drums, in this example the lower drum 28, in these two transverse directions for blade cutting coordination. It should be noted that in FIGS. 7 and 8 the exemplary helical blades 30 and 32 are, for better illustration of the uniformity of their coordination, shown as though their depicted coordination throughout their lengths would occur simultaneously once during each revolution of the drums in cutting relation, whereas in reality their coordination occurs progressively over the lengths of the blades from one end to the other end thereof once during each such revolution of the drums. Thus, in assembling any shear, including a shear of fair precision construction, there is almost invariably some disalignment of the cutting edges 78 and 80 of the companion blades 30 and 32, respectively, such as that indicated in FIG. 7 by the full-line cutting edge 78 of blade 30 and the dotted-line cutting edge 80 of the other blade 32, with the adjustment of the drum 28 carrying blade 32 being in the direction of the arrow or arrows 82, i.e., one of the transverse directions, in order to bring the front face 84 of blade 32 leading to its cutting edge 80 into the full-line parallelism with the front face 86 of the other blade 30 leading to its cutting edge 78, throughout the longitudinal extent of the blades. The other usual disalignment of the cutting edges 78 and 80 of the companion blades 30 and 32 on assembly of the shear, is such as that indicated in FIG. 8 by the full-line cutting edge 78 of blade 30 and the dotted-line cutting edge 80 of the other blade 32, with the adjustment of the drum 28 carrying blade 32 being in the direction of the arrows 88, i.e., in the other of the two transverse directions which is the one to and from the axis of the upper drum 26. With bodily adjustment of the lower drum in the two transverse directions bringing the companion blades 30 and 32 into the full-line coordination shown in FIGS. 7 and 8, there remains only one final blade adjustment to close the gap between the blades in their full-line coordination in FIG. 7 so that they will be gapless or have only very slight and predetermined clearance between them, substantially as depicted in FIG. 9. However, such final blade adjustment is achieved preferably and conveniently by relative angular adjustment of the drums in a manner described hereinafter.

For bodily adjustment of the lower drum 28 in the two transverse directions of the arrow or arrows 82 and of the arrow or arrows 88 (FIGS. 7 and 8), provisions are made for so bodily adjusting in these transverse directions the end bearings 44 of this lower drum 28 in the shear frame 22, and more particularly for so adjusting them at their sole supports in the shear frame, i.e., at their pivot supports 46 and their associated miscut eccentrics 48. To this end, and for adjustability of the lower drum 28 in one of the two transverse directions indicated by the arrows 82 in FIG. 7, the pivot 46 for each end bearing 44 of the lower drum has opposite end journals 90 rotatably mounted in the respective frame upright 40, and an intermediate eccentric formation 92 on which the end bearing 44 is swingable (FIGS. 2 and 3), and this pivot 46 further has an exemplary square head 94 accessible with a wrench for angular adjustment of the pivot and ensuing adjustment of the end bearing 44 and lower drum 28 in the direction of one of the arrows 82 in FIG. 7, as will be readily understood. Once adjusted, the pivot 46 is locked in position by any suitable means, such as a plug 96 received in a bore 98 in the frame upright 40 and tightened against one of the end journals 90 of the pivot by a screw 100 (FIG. 4).

For adjustability of the lower drum 28 in the other of the two transverse directions indicated by the arrows 88 in FIG. 8, being to and from the axis of the upper drum 26, the part 102 of the stud 104 in each end bearing 44 on which the roller 54 is turnable is an eccentric formation (FIG. 3), with the stud being angularly adjustable for adjustability of the end bearing 44 and lower drum 28 in the direction of one of the arrows 88 in FIG. 8, and the adjusted stud being locked in position by any suitable means, such as those shown in FIG. 4, for example.

Adjustment of the lower drum 28 in the two transverse directions for precise cutting coordination of the companion blades 30 and 32 as depicted in FIGS. 7 and 8, is achieved with particular ease as well as rapidity, by first adjusting, for example, one of the pivots 46 to bring only the nearby end of the lower blade 32 into precise cutting coordination with the adjacent end of the upper blade 30 in the direction of one of the arrows 82 in FIG. 7, and then adjusting the other pivot 46 to bring only the nearby end of the lower blade 32 into the same precise cutting coordination with the adjacent end of the upper blade 30 in the same direction. Thus, with these two simple pivot adjustments the companion blades 30, 32 are throughout their entire lengths brought into precise cutting coordination in one of the transverse directions (FIG. 7) even though the pivot adjustments are gauged only with reference to the adjacent ends of the blades. Instrumental in achieving this is the mount described hereinafter of the helical blades 30 and 32 on their drums which easily maintains the blades in helical disposition at the same helix angle throughout without the slightest deviation therefrom.

Having completed the adjustment of the pivots 46 for precise cutting coordination of the companion blades 30, 32 in the direction of the arrows 82 in FIG. 7, the lower drum 28 is adjusted for precise cutting coordination of these blades throughout their lengths as depicted in FIG. 8. This is achieved with the same ease and rapidity by first adjusting the roller stud 104 in one of the end bearings 44 with reference only to the nearby ends of the blades, and then adjusting the roller stud in the other end bearing 44 also with reference to the nearby ends only of the blades, as will be readily understood. Also since adjustment of the lower drum in the direction of the arrows 88 in FIG. 8 is for all practical purposes at right angles to the drum adjustment in the direction of the arrows 82 in FIG. 7, adjustment of the drum in either of these directions will in no wise change the finished drum adjustment in the other of these directions.

Since precise cutting coordination of the companion blades in the two respects depicted in FIGS. 7 and 8 requires in most any shear of fair precision construction bodily motion which in either of the two transverse directions is very slight at the most, the effective radii of the eccentric formations 92 and 102 of the pivots 46 and roller studs 104, respectively, may be relatively small, and are preferably relatively small for advantageous reasons already mentioned hereinbefore. Further, the end bearings 44 of the lower drum shaft 42 are preferably precision bearings affording accurate and long-lasting journal support for this shaft, with their accurate and long-lasting journal support of this shaft being in no wise adversely affected by whatever slight adjustments these end bearings will undergo for precise cutting coordination of the companion blades 30, 32.

As already mentioned, final blade adjustment for no gap or very slight predetermined clearance between the blades 30, 32 throughout their length, as depicted in FIG. 9, is preferably achieved by relative angular adjustment of the drums 26 and 28. To this end, the upper drum shaft 36 is axially slidable in the bearing apertures 38 (FIG. 1), and on first releasing the other gear 62 on the same shaft 36 (FIG. 1A) and also bringing the lower drum 28 into cut position in which the firmly mounted gear 68 on its shaft 42 is in mesh with the firmly mounted gear 66 on the upper drum shaft (FIG. 1), the upper drum shaft 36 is slid in the bearing apertures 38 and carries with it the upper drum 26 and gear 66 thereon so that the meshing helical teeth of the gears 66, 68 cooperate to cam the drums 26, 28 into relative rotation to bring the companion blades throughout their lengths into the no gap or slight predetermined clearance relation depicted in FIG. 9. Once this is achieved, the temporarily released gear 62 on the upper drum shaft 36 is again secured to the latter.

For axial sliding adjustment of the upper drum shaft 36 in the bearing apertures 38 for the purpose just described, there is provided a push-and-pull spindle 110 which is threadedly received in a casing 112 on one of the frame uprights 40 (FIG. 1), and forms part of a sleeve 114 turnably supported at 116 in the casing 112. Locked to the sleeve 114 for axial movement with the latter, but with freedom of rotation relative thereto, is the adjacent end of the upper drum shaft 36, with the lock being provided in this instance by antifriction bearings 118 which are interposed between shaft 36 and sleeve 114, and are with their inner and outer races 120 and 122 locked to this shaft and sleeve by shoulders 124 and 126 thereon of which one of the shoulders 124 is formed by a nut 128 on a threaded end of the shaft. The spindle 110 has a square head 130 (FIGS. 1 and 2) accessible with a wrench for axial adjustability of the sleeve 114 and therewith connected upper drum shaft 36 with its drum 26 and gear 66, with a nut 132 serving to lock these parts in axially adjusted position.

Adjustability of the lower drum 28 in one of the two transverse directions, i.e., to and from the axis of the upper drum 26 for the described purpose and as depicted in FIG. 8, may also be, and preferably is, used for simultaneous take-up of backlash in the gears 66 and 68 when they mesh in each cut cycle of the shear drums 26, 28.

As mentioned earlier, the mount of the helical companion shear blades 30, 32 on their drums 26 and 28 is another of the constructional features of the present shear which adapts the latter to cutting any kind of stock, and particularly metal stock. Thus, each of the blades 30 and 32 is, first of all, mounted directly to its drum 26 and 28 and without any adjustment intermediary, and is further mounted so firmly as to be for all practical purposes an integral part of its drum. To this end, the drum 26 has a shoulder 140 leading to the drum periphery, and a bottom rest 142 diverging from the shoulder 140, and the other drum 28 has a similar shoulder 144 and bottom rest 146 (FIGS. 1 and 5). The blades 30 and 32 are adapted to be located with their front faces 86 and 84 on the shoulders 140 and 144 of the respective drums 26 and 28 which determine the helical disposition of the blades, and these shoulders 140 and 144 are to this end machined in the drums 26 and 28 to extend with high accuracy helically at the same uniform helix angle throughout the length of the respective drums, with these shoulders 140 and 144 extending in opposite helical directions for progressive cut or shear cooperation between the blades 30 and 32 thereon (FIG. 1). The bottom rests 142 and 146 are also machined in the respective drums 26 and 28 and serve to locate the blades 30 and 32 with their bottom surfaces 148 and 150 on these drums (FIG. 5). The shear blade 30 has two series of longitudinally spaced holes 152 and 154, of which the holes 152 are in substantial alignment with tapped holes 156 in the shoulder 140 of the drum 26 when the blade is located on this shoulder 140 and on the bottom rest 142 of this drum, with bolts 158 extending through the holes 152 and being received in the tapped holes 156 for firmly clamping the blade to shoulder 140 (see also FIG. 1). Each of the other holes 154 in the blade 30 serves for the reception of a finger 160 at one end of a bracket 162 which with its other end 164 rests on another machined drum surface 166 continuing from the bottom rest 142 to the drum periphery, with a bolt 168, which extends through a hole 170 in the bracket 162 and is received in a tapped hole 172 in the drum surface 166, being tightened to draw and hold blade 30 with its bottom surface 148 firmly against the bottom rest 142 on the drum (see also FIG. 1). The other lower blade 32 is mounted in the same manner on the drum 28, and the same mounting provisions for the upper blade 30 on its drum 26 are used in mounting the blade 32 on its drum, with the mounting provisions for the lower blade 32 being designated by the same reference numerals as those for the upper blade with the prefix *a* added, however.

In accordance with another aspect of the present invention, each of the blades 30 and 32 is of parallelogram shape in cross-section. Thus, the bottom surface 148 of blade 30 extends parallel to the slanting top surface 176 which at its junction with the front face 86 forms the cutting edge 78. Similarly, the bottom surface 150 of the other blade 32 extends parallel to the slanting top surface 178 which at its junction with the front face 84 forms the cutting edge 80. The bottom rests 142 and 146 on the drums 26 and 28 slant the same as, and are in form-fit with, the bottom surfaces 148 and 150 thereon of the respective blades 30 and 32 when the latter are also located on the shoulders 140 and 144 of the respective drums 26 and 28 (FIG. 5). With this arrangement, each blade 30 or 32 may be removed from its drum and resharpened by uniform machining of its front face 86 or 84, not just once but as many times as desired, yet the cutting edge of the resharpened blade will, on each remounting of the latter on its drum, be returned exactly to its former spaced or overlap cut relation with the other blade, as will be readily understood. The same holds true if either blade is replaced with another identical blade. Since on each resharpening of either blade in the described manner and remounting of the resharpened blade on its drum, the holes in the blade, for instance the holes 152 in blade 30 on drum 28, will be displaced ever so slightly outwardly toward the drum periphery, these holes 152 are sufficiently large to receive the bolts 158 with clearance and permit their reception in the tapped holes 156 in the drum shoulder 140 no matter how many times the blade is resharpened.

Accurate location of the blades in precise helical disposition on the drums for their equally precise progressive cut or shear cooperation in operation of the shear, is thus built into the shear and is unfailingly achieved on merely mounting the blades on their drums. Also, mounting the blades on their drums involves merely the application and tightening of bolts which requires hardly any skill, yet accurate location of the blades on their drums is inevitable on mere tightening of these bolts.

The companion blades 30 and 32 are preferably and advantageously hard steel blades for cutting not only soft stock such as paper, for instance, but especially hard metal stock, including steel. Preferably, the cutting edges 78 and 80 of the blades 30 and 32 are formed by very hard inserts 180 and 182 in these blades.

The ready and highly accurate, as well as very firm, mount of the companion shear blades on the drums in very precise helical disposition thereon for their equally precise progressive cut or shear cooperation in operation of the shear, and the facile and compact adjustment of the lower drum for most accurate blade cutting coordination, are the prime factors which enable the shear to cut stock of any kind, including the hardest metals, with all the advantages springing from the use of helical blades. These same factors, coupled with the preferred very hard cutting edges of both companion blades, also account for much longer use of these blades before requiring resharpening. In this connection, it is known that in rotary "metal" shears with straight companion blades, of which one blade is adjustaby mounted on its drum for blade cutting coordination, the blades require resharpening after each eight hour operation of the shear on the average, while in the present shear with helical companion blades and in cutting the same metal stock, the blades were resharpened only at the end of a full work week during which the shear was in operation for almost twenty-four hours a day, yet they were thus resharpened at the end of a full work week only because of the convenience to do so at that time rather than in the middle of a productive work day, for these blades would have cut satisfactorily for about another half week requiring resharpening.

In accordance with another aspect of the present invention, each blade may have two cutting edges for alternative use. Thus, in the shear of FIG. 6, the blade 32' on the lower drum 28' has diagonally opposite cutting edges 80' and 80" of which the edge 80' is formed at the junction of the front face 84' and slanting top surface 178' of the blade, and the other cutting edge 88" is formed at the junction of the rear face 186 and slanting bottom surface 150' of the blade, with the slanting top and bottom surfaces 178' and 150' being preferably also parallel to each other and to the also slanting bottom rest 146' on the drum so that the bottom surface 150' of the blade is in formfit with this bottom rest when the blade is located on the latter and also on the drum shoulder 144'. Further, the holes 152a' and preferably also the holes 154a' in the blade, for the reception of the bolts 158a' and fingers 160a' of the brackets 162a', are equally spaced inwardly from the opposite cutting edges 80' and 80" for application of the blade to the drum with either cutting edge in cut position thereon.

While in the described shear adjustability of both end bearings of the lower drum for accurate blade cutting coordination is advantageously provided for, it is, of course, within the ambit of the invention to provide for such adjustability of only one of these end bearings to achieve virtually as accurate blade cutting coordination with or without the aid of shims in achieving particularly their coordination as depicted in FIG. 8. Further, while in the described shear much preferred helical companion shear blades are used, the same may obviously be provided with straight companion blades if such should be desired for any specific reason. Also, while the described important advantages in the respects of cutting stock of any kind, including metal, with helical shear blades, long-time use of the blades before requiring resharpening, and easy and quick, as well as highly accurate, cutting coordination of the blades, are secured in the present shear of exemplary miscut type, these same advantages are as fully secured in a rotary shear featuring similar adjustability of one drum and similar blade mounts on the drum, but being of non-miscut type. In this connection, even the exemplary shear shown would be such a non-miscut shear if the same were devoid of miscut eccentrics and the follower rollers on the end bearings of the lower drum would, instead, rest on fixed surfaces of the shear frame.

What is claimed is:

1. In a rotary miscut shear, the combination of a shear frame; a pair of shear drums with companion shear blades thereon; two pairs of opposite end bearings for rotary support of said drums, respectively, with the drum axes lying substantially in a common plane and in substantial parallelism with each other, of which the end bearings of one pair are firmly mounted in said frame, and the other end bearings of the other pair carry adjustable stops, respectively; separate mounts for said other end bearings, of which each mount provides a pivot mounted in said frame for adjustment to and from said plane and extending with its axis parallel to the axis of the drum supported in said one pair of end bearings, and a support spaced from said pivot, with one of said other end bearings being swingable on said pivot and resting with its stop on said support, and adjustment of said pivot and stop of each mount being for cutting coordination of the companion blades; a drive connection between said drums to maintain their blades in relative angular cut relation in turning said drums; and means for jointly moving said supports of said mounts into first and second positions in which the blade on the drum supported in said other end bearings is in cut and miscut relation, respectively, with the blade on the other drum.

2. The combination in a rotary miscut shear as in claim 1, in which said stop on each of said other end bearings is a stud mounted in the latter for rotative adjustability and extending with its axis parallel to the axis of the associated pivot, with said stud having an eccentric formation resting on the associated support.

3. The combination in a rotary miscut shear as in claim 1, in which said pivots of said mounts are axially aligned and mounted in said frame for rotative adjustment therein, and said pivots have eccentric formations on which said other end bearings are swingable, and said stops are axially aligned studs mounted in said other end bearings, respectively, for rotative adjustability and extending with their axes parallel to said pivot axes, with said studs having eccentric formations resting on the associated supports.

4. The combination in a rotary miscut shear as in claim 3, in which rollers are turnable on said eccentric formations on said studs and rest on the associated supports, and said supports are miscut cams turnable in unison about a common axis parallel to said stud axes for cut and miscut action of the companion blades.

5. The combination in a rotary miscut shear as in claim 3, which further provides spring means for each of said other end bearings to maintain it with its roller in follower relation with the associated miscut cam.

6. The combination in a rotary miscut shear in claim 1, in which each drum has a substantially uninterrupted longitudinal machined shoulder extending helically of the drum, and each of said companion shear blades has a front face and a top surface and a cutting edge at the junction of said front face and top surface, with said blades being with their front faces located and removably mounted on said shoulders on said drums.

7. The combination of a rotary miscut shear as in claim 6, in which said blades have the same hard-steel cutting edges for cutting soft and hard stock, including metal.

References Cited
UNITED STATES PATENTS

| | | | |
|---|---|---|---|
| 2,850,092 | 9/1958 | Teplitz | 83—344X |
| 3,276,306 | 10/1966 | Winkler et al. | 83—344X |
| 3,289,513 | 12/1966 | Johnson et al. | 83—344 |
| 3,405,580 | 10/1968 | Hallden | 83—305 |
| 3,359,843 | 12/1967 | Mead | 83—674X |

FRANK T. YOST, Primary Examiner

U.S. Cl. X.R.

83—342, 344, 699